Nov. 29, 1927.
J. A. BAILEY
1,650,814
AUTOMOBILE GATE
Filed July 26, 1927
2 Sheets-Sheet 2
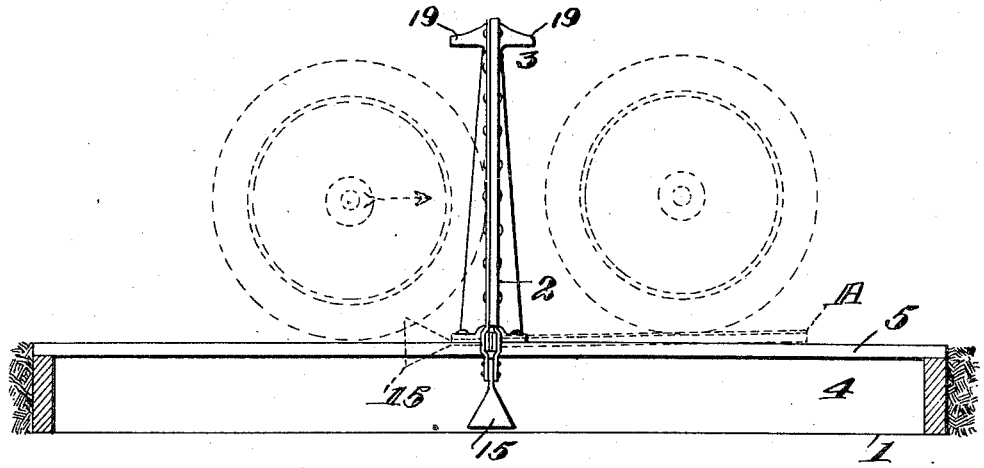
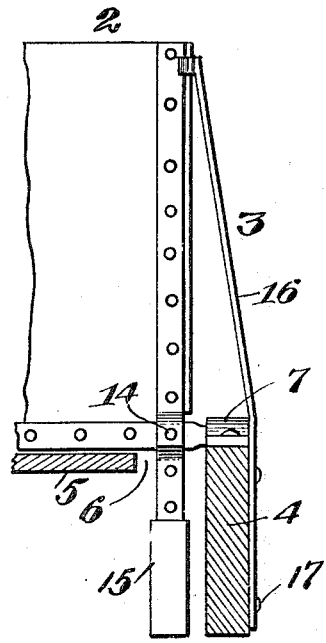
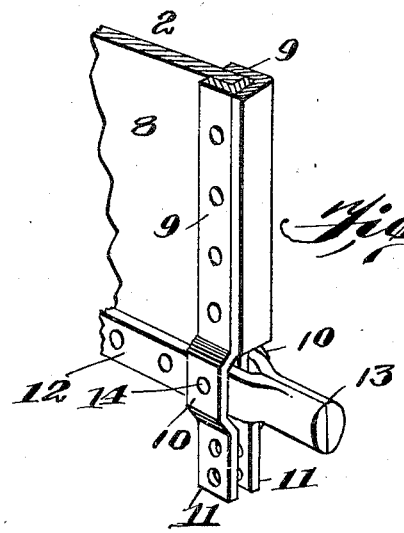
Inventor
J. A. Bailey.
By E. E. Vrooman &co.,
His Attorneys.

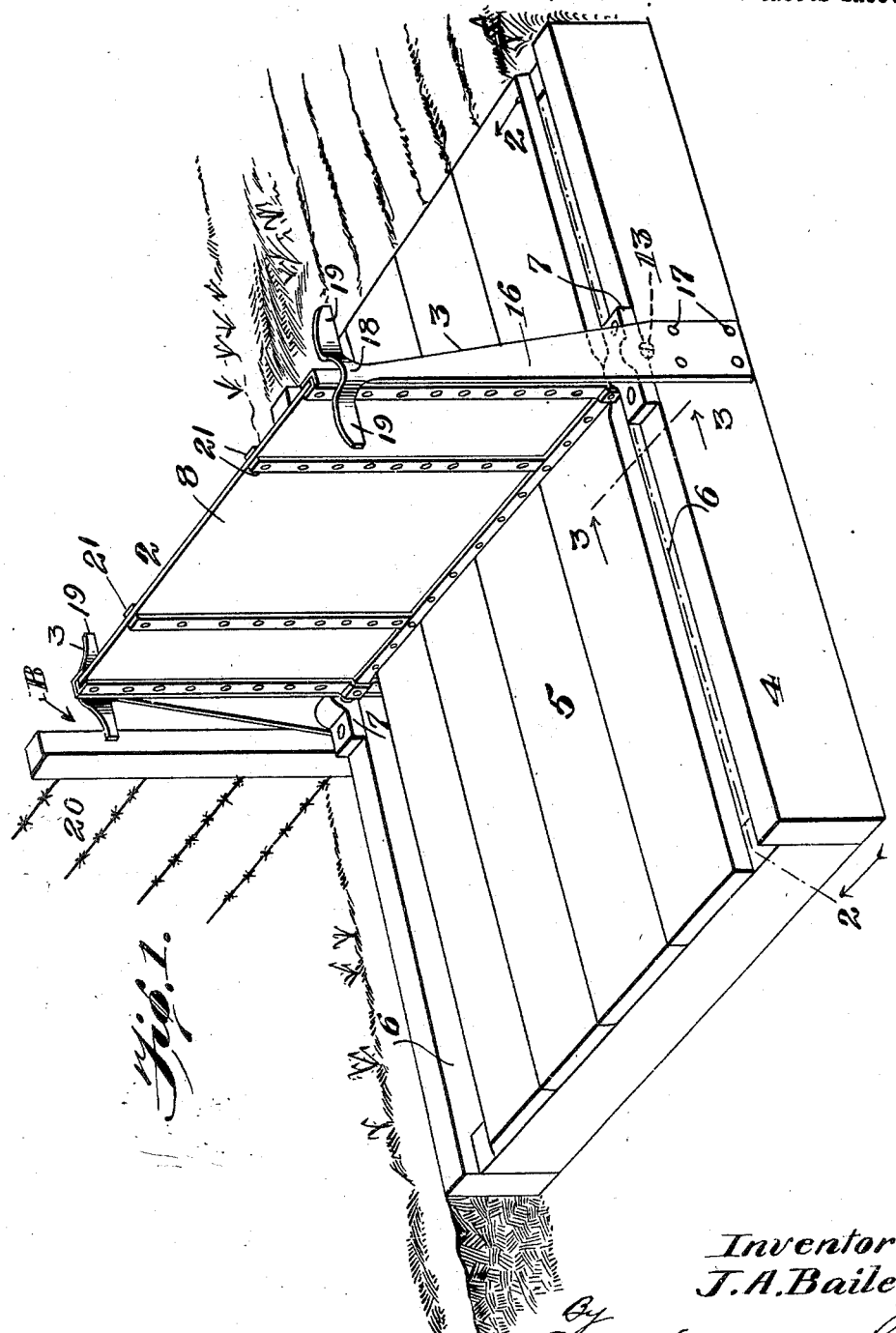

Patented Nov. 29, 1927.

1,650,814

UNITED STATES PATENT OFFICE.

JOHN AMITY BAILEY, OF WILLOWS, CALIFORNIA.

AUTOMOBILE GATE.

Application filed July 26, 1927. Serial No. 208,511.

This invention relates to automobile gates.

The object of the invention is the construction of a simple and efficient gate that an automobile can pass over, and then the gate assume an upright or closed position, for closing an opening or a roadway.

Another object of the invention is the construction of a movable gate that can be moved to an open position, by an object passing over the same, and then afterwards the gate will be retained by spring or yieldable holding means in a closed position against accidental opening.

With the foregoing and other objects in view, my invention comprises certain novel constructions, combinations, and arrangements of parts as will be hereinafter described, illustrated in the accompanying drawings and more particularly pointed out in the appended claims.

In the drawings:

Figure 1 is a perspective view of a gate constructed in accordance with the present invention.

Figure 2 is a sectional view taken on line 2—2, Figure 1, and looking in the direction of the arrows.

Figure 3 is a sectional view taken on line 3—3, Figure 1, and looking in the direction of the arrows.

Figure 4 is a fragmentary, perspective view of the gate.

Referring to the drawings by numerals: In the foregoing description, I have used the term "gate" to designate the entire apparatus; this apparatus includes the platform 1, pivotally mounted gate 2 and the spring or yieldable holding bars 3. The platform includes the frame 4 on which is laid the floor 5. This floor, at its side edges, is spaced from the sides of the frame 4 to form slots 6 for the purpose hereinafter described.

On the top edges of the sides of frame 4 are fastened bearings 7, in which is pivotally mounted the gate 2.

The gate 2 comprises the body 8 that has at its ends pairs of overlapping angle irons 9, 9 (see Figs. 1 and 4). These vertical angle bars 9 of each pair, constitute a channel in which is seated the body 8. The lower end of each bar 9 is bowed outwardly at 10 and terminates in a downwardly extending leg 11. Parallel bars 12 are fastened on the lower edge of body 8 and are brought together at their ends, as clearly shown in Figure 4, and rounded, to form trunnions 13. These trunnions are journalled in the bearings 7. A rivet 14 extends through the outwardly bulged portions 10, bars 12, and body 8, holding the parts fixedly secured together.

The legs 11 extend downwardly through the slots 6 of the platform. A depending weight 15 is fastened at its upper end between the legs 11 of each pair. These weights 15 serve to hold the gate 2 in a vertical position, until moved to a horizontal position, against the floor 5, as shown by dotted lines A (Fig. 2) by an automobile or other object passing over the gate. After the automobile has passed over the gate, the weights 15 will cause the gate to immediately swing to a vertical position, between the spring bars 3.

There are two spring bars 3, of similar construction, and it will only be necessary to specifically describe one. Each spring or yieldable bar 3 comprises a vertical body 16 that is securely fastened, at 17, to the side of the frame 4. The body at its upper end terminates in an outwardly rounded or bulged portion 18 having at its ends horizontal, curved ears 19, so that the gate can easily ride in between the bars irrespective as to which way the gate has been moved to a horizontal position upon the platform; when the gate is in the position shown in Figure 2 at A, it is ready to swing upward, by reason of the weights, and in doing so, it will strike between the curved ears 19 on one and the same sides of the bars 3, causing the bars to spring slightly outward to let the gate be seated in the "sockets" constituted by the outwardly bulged portion 18, whereby the gate will be held in a closed position against accidental displacement or opening.

The gate apparatus is built in a roadway, and preferably for closing an opening B in fence 20 (Fig. 1). The roadway, of course, is excavated sufficient to receive the platform 1, so that the vehicles will pass easily from the roadway onto floor 5, and thence over the gate 2.

The gate body 8 is reinforced by vertical, parallel bars or plates 21.

From the foregoing description, it will be understood that I have produced a weighted swinging gate held normally in a closed position by spring or yieldable fastening means, and that the gate is susceptible of laying flat against a floor or "roadway" to allow an object such as an automobile to pass entirely over the same, whereupon the gate will then automatically assume its closed position, held by laterally movable and yieldable fastening means.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In an automobile gate, the combination with a platform, of a weighted swinging gate mounted upon said platform, and laterally movable fastening means above said platform and engaging and holding said gate in a closed position.

2. In an automobile gate, the combination with a platform, of a pivotally mounted gate on said platform, and spring bars fastened to said platform and engaging the ends of and normally holding said gate in a closed position.

3. In an automobile gate, the combination with a platform, of a movable gate on said platform, spring bars fastened to said platform, and each bar provided with a socket-like portion receiving an end of the gate for normally holding the gate in a closed position.

4. In an automobile gate, the combination with a platform, of a pivotally mounted gate carried by said platform, spring bars at opposite sides of the platform, each spring bar provided at its upper end with an outwardly bulged portion and with curved ears extending from said bulged portion, whereby the ends of said pivotal gate can swing against said ears and move into the bulged portions of the bars and be held in said bulged portions, against accidental movement.

5. In an automobile gate, the combination with a platform, of a pivotally mounted gate carried by said platform, vertical spring bars at opposite sides of the platform and said gate, each of said spring bars fastened at its lower end to the side of the platform, each bar provided at its upper end with an outwardly bulged portion constituting a socket, and said outwardly bulged portion provided at its ends with integral horizontal-extending outwardly-curved ears, whereby the ends of said swinging gate can strike the ears and move into said sockets and be held between the bars against accidental swinging.

6. In an apparatus of the class described, the combination with a platform, of a gate comprising a body, overlapping bars on each side edge of said body, a pair of bars on the lower edge of said body and extending between all of said overlapping bars, said pair of bars provided with trunnion-like ends, said trunnion-like ends journalled upon said platform, and weights suspended from said overlapping bars.

7. In an apparatus of the class described, the combination with a platform, of a gate above said platform, said gate comprising a body, a pair of vertical bars on each side edge of said body, said vertical bars provided with outwardly bulged portions near the lower edge of said body, horizontal bars in said outwardly bulged portions and against the lower edge of said body, means fastening the ends of said horizontal bars upon said platform, and weights secured to said vertical bars below said horizontal bars.

8. In an apparatus of the class described, the combination with a platform, of a gate above said platform, said gate comprising a body, pairs of overlapping angle iron vertical bars on the side edges of said body, said bars provided with outwardly bulged portions near the lower edge of the body and with depending spaced legs, a pair of horizontal bars on the lower edge of the body and within the outwardly bulged portions of the vertical bars, said horizontal bars being rounded at their ends producing trunnions, means journalling and fastening said trunnions upon said platform, and weights fastened between the legs of said vertical bars.

In testimony whereof I hereunto affix my signature.

JOHN AMITY BAILEY.